United States Patent
Dimitriou et al.

(10) Patent No.: US 8,454,083 B2
(45) Date of Patent: Jun. 4, 2013

(54) MOTOR VEHICLE HAVING A WINDSHIELD AND CHASSIS PILLARS

(75) Inventors: Ioannis Dimitriou, Marzling (DE); Holger Winkelmann, Guentersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/343,242

(22) Filed: Jan. 4, 2012

(65) Prior Publication Data

US 2012/0104800 A1    May 3, 2012

Related U.S. Application Data

(63) Continuation of application No. PCT/EP2010/062458, filed on Aug. 26, 2010.

(30) Foreign Application Priority Data

Aug. 28, 2009   (DE) .......................... 10 2009 039 037

(51) Int. Cl.
*B60J 7/00*   (2006.01)
(52) U.S. Cl.
USPC .................................................... 296/193.06
(58) Field of Classification Search
USPC ............... 296/193.06, 100.06, 26.09, 3, 39.1, 296/57.1, 26.11, 100.09, 187.05, 97.8; 224/404; 180/274; 410/129; 280/730.1
See application file for complete search history.

(56) References Cited

U.S. PATENT DOCUMENTS

| | | | | |
|---|---|---|---|---|
| 2,933,344 A | * | 4/1960 | Shumaker | 296/91 |
| 3,008,756 A | * | 11/1961 | Lindhardt | 296/91 |
| 3,059,562 A | * | 10/1962 | Sturtevant et al. | 454/130 |
| 3,072,431 A | * | 1/1963 | Shumaker | 296/91 |
| 3,089,728 A | * | 5/1963 | Shumaker | 296/91 |
| 3,090,645 A | * | 5/1963 | Shumaker | 296/91 |
| 3,097,882 A | * | 7/1963 | Andrews | 296/91 |
| 3,427,067 A | * | 2/1969 | Kish | 296/91 |
| 3,647,257 A | * | 3/1972 | Litchfield | 296/91 |
| 3,785,699 A | * | 1/1974 | Molaskey et al. | 296/152 |
| 3,799,603 A | * | 3/1974 | Bott | 296/180.1 |
| 3,856,193 A | * | 12/1974 | Bott | 224/316 |
| 3,929,369 A | * | 12/1975 | Blair | 296/180.3 |
| 3,960,402 A | * | 6/1976 | Keck | 296/180.4 |
| 3,999,797 A | * | 12/1976 | Kirsch et al. | 296/180.4 |

(Continued)

FOREIGN PATENT DOCUMENTS

| DE | 69 40 346 U | 1/1970 |
|---|---|---|
| DE | 10 2004 032 726 A1 | 2/2006 |

(Continued)

OTHER PUBLICATIONS

German Search Report dated Sep. 7, 2010 including partial English-language translation (Nine (9) pages).

(Continued)

*Primary Examiner* — Kiran B Patel
(74) *Attorney, Agent, or Firm* — Crowell & Moring LLP

(57) ABSTRACT

In a motor vehicle, a gap-shaped opening is provided between lateral end sections of the windshield and adjacent A-pillars. The air flows through this gap-shaped opening when the motor vehicle is moving. This reduces the formation of high loss vortices in the lateral area of the motor vehicle.

10 Claims, 2 Drawing Sheets

U.S. PATENT DOCUMENTS

| | | | | |
|---|---|---|---|---|
| 4,170,381 | A * | 10/1979 | Helm | 296/91 |
| 4,179,154 | A * | 12/1979 | Ingram | 296/91 |
| 4,309,053 | A * | 1/1982 | Lett | 296/180.4 |
| 4,339,145 | A * | 7/1982 | Bott et al. | 296/180.1 |
| 4,465,154 | A * | 8/1984 | Hinderks | 180/89.2 |
| 4,674,788 | A * | 6/1987 | Ohmura et al. | 296/180.5 |
| D291,978 | S * | 9/1987 | Parr et al. | D12/181 |
| 4,726,618 | A * | 2/1988 | Hansen | 296/91 |
| D307,411 | S * | 4/1990 | Bott | D12/181 |
| 5,018,779 | A * | 5/1991 | Lund | 296/180.1 |
| 5,150,941 | A * | 9/1992 | Silzer et al. | 296/152 |
| 5,338,088 | A * | 8/1994 | Stanesic | 296/180.1 |
| 5,382,070 | A * | 1/1995 | Turner | 296/180.1 |
| 5,435,617 | A * | 7/1995 | Stanesic | 296/180.1 |
| D406,555 | S * | 3/1999 | Huang | D12/181 |
| D427,126 | S * | 6/2000 | Won et al. | D12/181 |
| 6,224,135 | B1 * | 5/2001 | Rehkopf | 296/91 |
| 6,241,302 | B1 * | 6/2001 | Rehkopf | 296/91 |
| 6,883,848 | B1 * | 4/2005 | Iverson et al. | 296/3 |
| 8,172,307 | B2 * | 5/2012 | Froeschle et al. | 296/180.1 |
| 2004/0238246 | A1 * | 12/2004 | Ceccarani et al. | 180/68.1 |
| 2005/0184544 | A1 * | 8/2005 | Iverson et al. | 296/3 |
| 2010/0320796 | A1 * | 12/2010 | Hoefer et al. | 296/93 |
| 2011/0000727 | A1 * | 1/2011 | Froeschle et al. | 180/68.1 |

FOREIGN PATENT DOCUMENTS

| | | |
|---|---|---|
| EP | 1 544 089 A1 | 6/2005 |
| GB | 1 281 254 | 7/1972 |
| JP | 62-65370 U | 4/1987 |
| JP | 62-106881 U | 7/1987 |

OTHER PUBLICATIONS

International Search Report dated Oct. 28, 2010 including English-language translation (Four (4) pages).

* cited by examiner

MOTOR VEHICLE HAVING A WINDSHIELD AND CHASSIS PILLARS

CROSS-REFERENCE TO RELATED APPLICATIONS

This application is a continuation of PCT International Application No. PCT/EP2010/062458, filed Aug. 26, 2010, which claims priority under 35 U.S.C. §119 from German Patent Application No. DE 10 2009 039 037.5, filed Aug. 28, 2009, the entire disclosures of which are herein expressly incorporated by reference.

BACKGROUND AND SUMMARY OF THE INVENTION

The invention relates to a motor vehicle having a windshield with lateral end sections provided with chassis (body) pillars.

Such motor vehicles are well-known and have a plurality of chassis pillars that form the so-called "greenhouse," that is, the area of the passenger compartment above the shoulder line. When the prior art vehicles are moving, the deflection of the air flow causes a flow separation in the area of the front chassis pillars, hereinafter also referred to as the A pillars. The resulting separation region, also called the "A pillar vortex," has a highly variable characteristic as a function of the tilt and/or camber of the windshield. The steeper the windshield in relation to the horizontal plane and/or the less cambered the windshield, the larger the separation region. The separation region causes vortices with a high negative pressure in the vortex core and, hence, considerable air flow losses in the area of the greenhouse that in turn leads to an increase in the $c_w$ value of the motor vehicle and an increase in the rear axle lift. The vortices occur primarily in the lower and middle area of the A pillar, that is, in the area, in which the outside rear mirror is usually attached.

The object of the invention is to improve the aerodynamic properties of motor vehicles of the above-described type.

This and other objects are achieved with a motor vehicle having a windshield with lateral end sections provided with chassis pillars, in which an oblong opening is provided between at least one lateral end section of the windshield and the adjacent chassis pillar.

In accordance with the invention, a "through flow" is enabled of at least one lateral end section of the windshield of the motor vehicle by providing an opening between the windshield and the chassis pillar. The flow (air stream) that is generated by the moving vehicle is channeled through this opening. In this way, the flow is returned in a defined manner into an air stream that flows snugly around the greenhouse. Thus, the flow through the opening at the A pillar results in a reduction in the separation region in the lateral area of the motor vehicle. This feature weakens the vortices in the area of the A pillar, as a result of which the $c_w$ value of the motor vehicle is reduced and the rear axle lift is minimized. In addition, the flow around the outside rear mirror, which is mounted in the area of the A pillar, is improved.

Of course, it is well-known to guide the air that flows around the motor vehicle between the lateral end sections of the rear window and the rear chassis pillar, also called the "C pillar." This strategy is implemented, for example, in the Ferrari 599 GTB vehicle and the Ford Iosis Max concept vehicle. However, the C pillar in the prior art motor vehicles only acts as an air flow guiding element that guides the flow in the direction of the rear window and/or the rear hatch opening or, more specifically, the trunk lid, in order to achieve a flow that remains, as long as possible, in the rear hatch area of the motor vehicle and, in so doing, reduces the size of the dead water zone in the area of the rear window. As a result, the known motor vehicles do not provide any indication of the solution according to the invention.

The opening is configured comparatively narrow and oblong along the course of the A pillar, thus, in the form of a slot or a gap. Preferably, both the right and the left end sections of the windshield have an opening. However, it is, of course, also possible to provide an opening on only one side of the vehicle.

The size of the opening can remain constant along the vertical extent of the A pillar. Preferably, the width of the opening tapers off upwards, so that a passage for the flowing air is created in the manner of an upwardly narrowing channel. Of course, the width of the opening along the course of the A pillar can also vary elsewhere.

The opening begins preferably at the lower end of the A pillar, at the so-called A pillar root, and extends preferably upwards as far as about the middle of the vertical extent of the A pillar, because the air flowing around this area exhibits especially strong turbulence. However, the opening can also extend even further upwards.

Preferably, the channel-shaped opening extends continuously upwards from the A pillar root. Of course, the passage for the flow air can also be implemented with two or more adjacent openings by providing one or more transverse members between the lateral end section and the A pillar, for example, in order to increase the rigidity of the A pillar. The transverse members can be adhesively cemented, for example, to the windshield or screwed to the windshield by means of bore holes in the windshield.

Preferably, the A pillar is configured as an airfoil profile. In airfoil profiles the front edge forms a negative pressure area ("suction peak") that generates a force directed opposite the direction of travel and thereby reduces in total the air resistance of the motor vehicle.

The A pillar is preferably configured as a hollow body having a closed cross-section. However, an open profile can also be connected to the windshield, but not exclusively with such A pillars that have no bearing function (see the following explanation).

The cross-sectional shape and/or the size of the cross-sectional area of the A pillar can remain constant along the course of the A pillar or can vary along the A pillar. In the case of an airfoil-like cross-section of the A pillar, the angle, at which the ligament of the airfoil profile is arranged relative to the transverse direction of the motor vehicle and/or the horizontal plane, can remain constant or vary along the vertical extent of the A pillar. When the angle changes, the result is an A pillar that turns in on itself.

The A pillar can be adapted to the respective flow topology of the motor vehicle concerned by means of the geometric configuration. The geometric design is carried out on the basis of measurements (wind tunnel, road test, etc.) or numerical simulation.

In the context of the present invention, the term "A pillar" is defined as any device that is connected to the lateral end sections of the windshield. This definition also includes such elements of the invention that do not have a bearing function. Such elements are configured, for example, as the trim parts with air flow guiding properties ("layer"). Since they do not have a bearing function, it is not necessary that they be connected to the region of the front hood or to the roof of the motor vehicle. Naturally another bearing element has to be provided for a motor vehicle with such non-bearing elements. This bearing element, which has to be provided as an alternative, can be formed, for example, by a so-called "cage", as known, for example, from the touring car sport. A component of this cage is disposed behind the windshield and rigidly connected to the floor of the motor vehicle chassis. As a result, the windshield bears exclusively the forces generated by the air stream, for which reason the windshield may be changed, if desired, as a function of its design and material strength. As an alternative, the elements that bear by way of replacement may also be constructed in the form of a pillar, which is covered by the lateral end sections of the windshield and which is not perceived or not perceived at first glance from outside the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
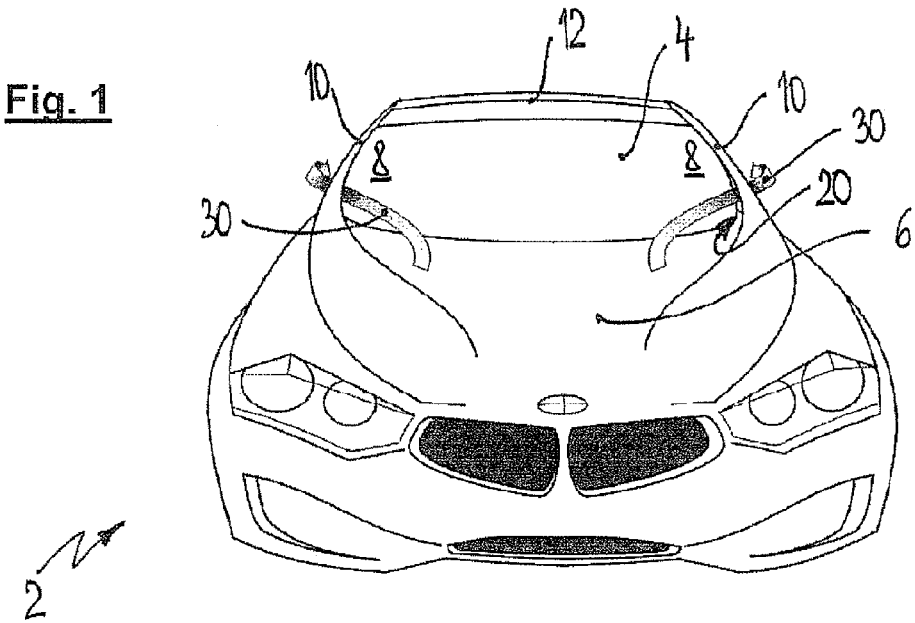
FIG. 1 is a front view of an exemplary motor vehicle according to the invention.
Figure 2:
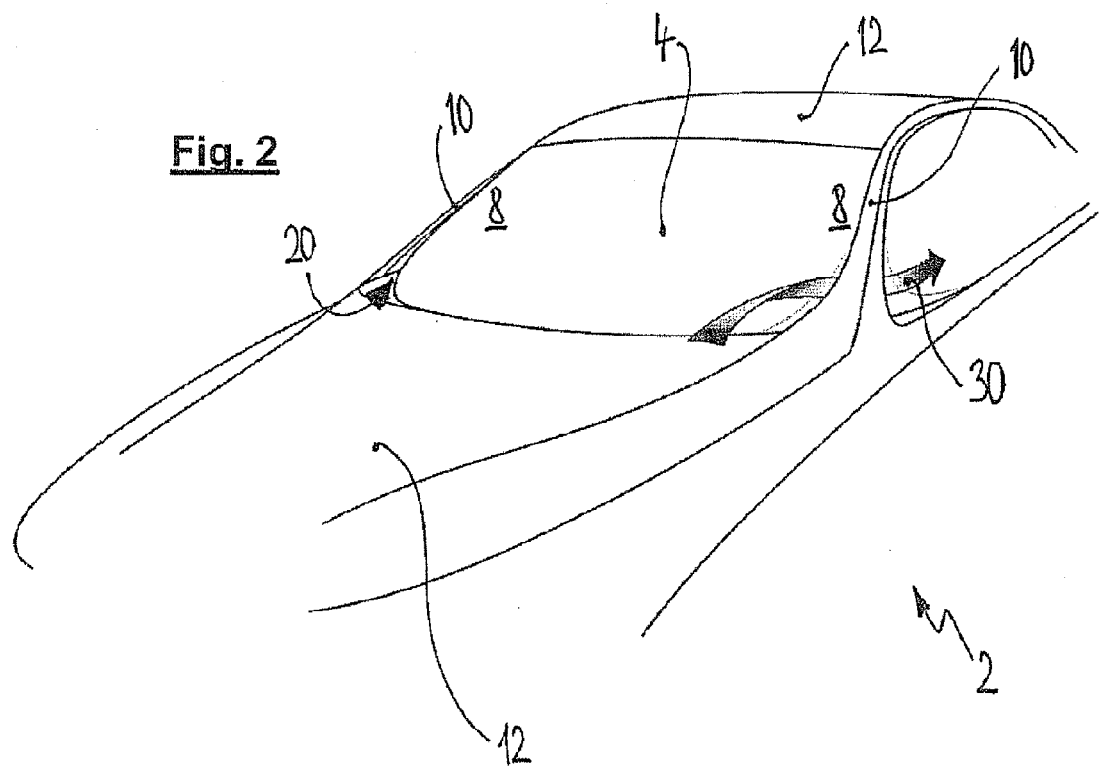
FIG. 2 is a perspective view of a section of the motor vehicle from FIG. 1.
Figure 3:
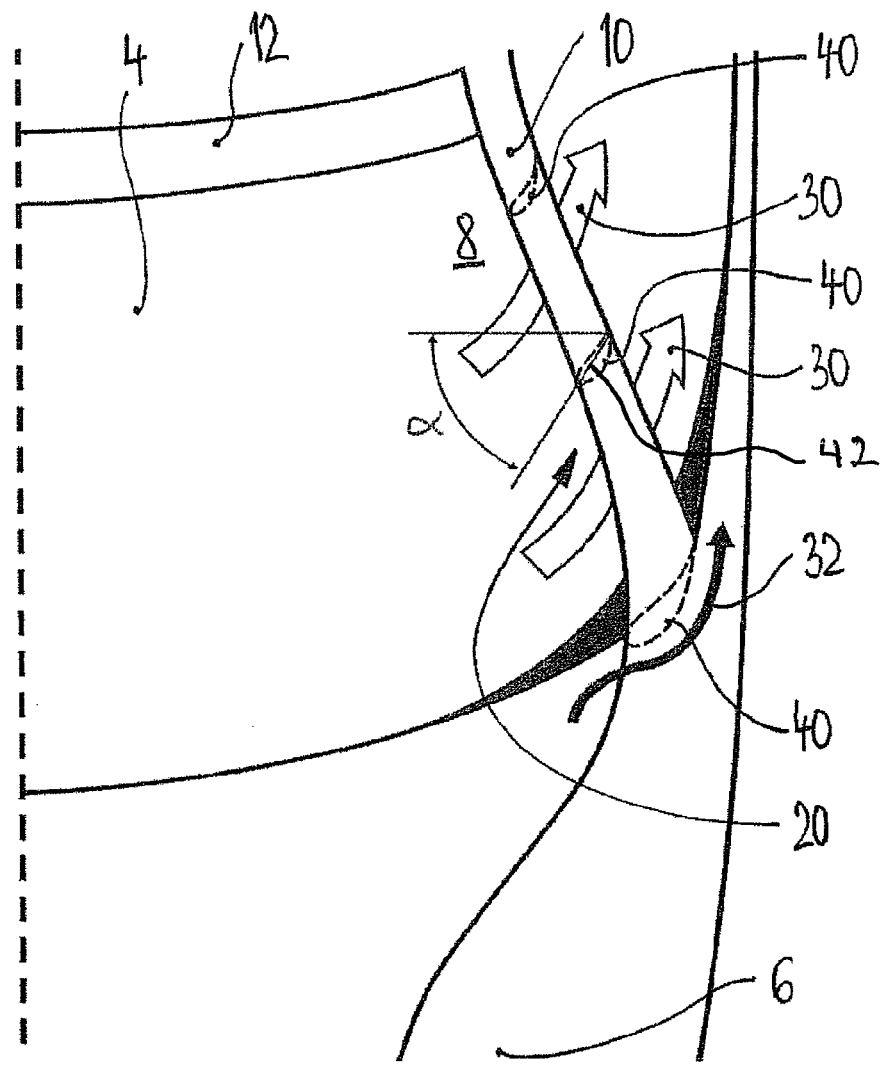
FIG. 3 is an exploded view of the area of the A pillar of the motor vehicle from FIG. 1.
Figure 3:
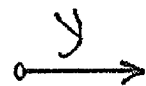

FIGS. 1 to 3 show a motor vehicle, which is labeled 2 in its entirety, with a windshield 4. The windshield 4 is connected to a front hood 6 and extends over almost the entire width of the motor vehicle 2. Adjacent to the left and right lateral end section 8 of the windshield 4 there is an A pillar 10. Above the windshield 4 there is a roof 12.

According to an embodiment of the invention, an opening 20 is provided between the lateral end sections 8 of the windshield 4 and the A pillars 10. The opening 20 is configured as a slot-shaped gap that extends from the lower end of the A pillar 10 to about half the vertical extent of the A pillar 10.

The opening 20 enables the passage of air while the motor vehicle 2 is moving. The air flowing through the openings 20 is symbolized with the arrows 30. The ratio of air that flows around the A pillar 10 on the outside is shown with the arrow 32 in FIG. 3.

FIG. 3 shows the cross-section 40 of the A pillar 10 with a dashed line. As clearly evident, the size of the cross-section 40 varies along the vertical extent of the A pillar 10. Diverging from the depicted exemplary embodiment, the form and the orientation of the cross-section 40 can vary along the A pillar 10. The orientation of the cross-section 40 is depicted by the chord 42 of the airfoil profile (angle α relative to the transverse direction Y of the vehicle). In addition, the angle of the chord 42 in relation to a horizontal plane can also vary along the A pillar 10.

In summary the invention can be described as follows. In a motor vehicle 2, a gap-shaped opening 20 is provided between the lateral end sections 8 of the windshield 4 and the adjacent A pillars 10. The air 30 flows though this gap-shaped opening when the motor vehicle 2 is moving. This feature reduces the formation of high loss vortices in the lateral area of the motor vehicle 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a front windshield having an exterior surface facing in a forward travel direction of the motor vehicle and having lateral end sections;
   a chassis pillar provided at each of the lateral end sections of the windshield; and
   an oblong opening configured between at least one lateral end section of the windshield and an adjacent chassis pillar.

2. The motor vehicle according to claim 1, wherein the oblong opening extends from a lower end of the chassis pillar to about one-half of a vertical extent of the chassis pillar.

3. The motor vehicle according to claim 1, wherein the chassis pillar has a cross-section with an airfoil profile.

4. The motor vehicle according to claim 2, wherein the chassis pillar has a cross-section with an airfoil profile.

5. The motor vehicle according to claim 3, wherein the cross-section of the chassis pillar varies along a vertical extent of the chassis pillar.

6. The motor vehicle according to claim 4, wherein the cross-section of the chassis pillar varies along a vertical extent of the chassis pillar.

7. The motor vehicle according to claim 3, wherein an angle at which a chord of the airfoil profile is arranged relative to at least one of a transverse direction of the motor vehicle and a horizontal plane varies along the vertical extent of the chassis pillar.

8. The motor vehicle according to claim 4, wherein an angle at which a chord of the airfoil profile is arranged relative to at least one of a transverse direction of the motor vehicle and a horizontal plane varies along the vertical extent of the chassis pillar.

9. The motor vehicle according to claim 5, wherein an angle at which a chord of the airfoil profile is arranged relative to at least one of a transverse direction of the motor vehicle and a horizontal plane varies along the vertical extent of the chassis pillar.

10. The motor vehicle according to claim 6, wherein an angle at which a chord of the airfoil profile is arranged relative to at least one of a transverse direction of the motor vehicle and a horizontal plane varies along the vertical extent of the chassis pillar.

* * * * *